United States Patent [19]

Khanna

[11] 3,962,197

[45] June 8, 1976

[54] SUSPENSION POLYMERIZATION PROCESS

[75] Inventor: Ravi Khanna, Rochester, N.Y.

[73] Assignee: Eastman Kodak Company, Rochester, N.Y.

[22] Filed: Jan. 2, 1975

[21] Appl. No.: 538,069

Related U.S. Application Data

[63] Continuation-in-part of Ser. No. 380,318, July 18, 1973, abandoned.

[52] U.S. Cl. .................................. 526/79; 526/80; 526/88; 526/202; 526/329; 526/347
[51] Int. Cl.² ........................ C08F 2/18; C08F 2/20
[58] Field of Search .......... 260/93.5 W, 86.7, 80.78, 260/80.81, 80 M, 80.6; 450/639, 88.1 P, 80.3 R, 80.3 N

[56] References Cited
UNITED STATES PATENTS

| | | | |
|---|---|---|---|
| 2,694,700 | 11/1954 | Shanta | 260/88.7 |
| 2,701,245 | 2/1955 | Lynn | 260/89.5 |
| 2,715,118 | 8/1955 | Grim | 260/93.5 |
| 3,172,878 | 3/1965 | Chomitz | 260/88.2 |
| 3,390,142 | 6/1968 | Benetta et al. | 260/92.8 |
| 3,462,380 | 8/1969 | Ronden et al. | 260/2.5 |
| 3,629,211 | 12/1971 | Nozaki | 260/80.78 |
| 3,634,251 | 6/1972 | Maeda et al. | 252/62.1 |
| 3,753,909 | 8/1973 | Hulse et al. | 252/62.1 |

*Primary Examiner*—Stanford M. Levin
*Attorney, Agent, or Firm*—G. W. Neuner

[57] ABSTRACT

A non-continuous suspension polymerization process for the production of finely-divided, low molecular weight polymeric particles of an aryl monomer is carried out in a heated aqueous suspension media at a polymerization temperature above the glass transition temperature of the desired polymer. The monomer reactants and the polymerization initiator are substantially simultaneously introduced into the heated suspension media at a slow, substantially continuous rate over a time within the range of from 20 to about 85 percent of the total polymerization reaction time. The suspension media is subjected to high-rate shearing throughout the reaction.

8 Claims, No Drawings

SUSPENSION POLYMERIZATION PROCESS

This application is a continuation-in-part of Khanna, U.S. Ser. No. 380,318, filed July 18, 1973, now abandoned.

FIELD OF THE INVENTION

This invention relates to a suspension polymerization process, and in particular, to an aqueous suspension polymerization process useful for the preparation of polymers of aryl monomers and copolymers of aryl monomers and other polymerizable ethylenically unsaturated monomers.

PRIOR ART

Four general processes have been commonly employed to prepare polymers by the addition polymerization of aryl monomers, namely bulk, solution, suspension, and emulsion polymerization processes. Each of these processes possesses certain advantages and disadvantages. One normally employs the process which is a compromise depending upon the monomer(s) to be polymerized, their solubility, the medium desired, such as bulk, solution or latex, the form of the product desired, and such other variables as are significant in the specific polymer preparation to be accomplished.

For example, if a copolymer of a vinyl aryl monomer and an acrylic and/or methacrylic monomer is to be used as a binder for fusible electroscopic toner particles, it is often desirable to prepare the copolymer as finely divided particles having a relatively low molecular weight. Similarly, if it is desired to use the copolymer of a vinyl aryl monomer to prepare crosslinked fusible toner particles such as described in Jadwin et al., copending patent application Ser. No. 380,317 filed July 18, 1973, it is desirable to crosslink the copolymer and obtain finely-divided fusible crosslinked copolymer particles. In this regard, it has been found that emulsion polymerization processes generally produce copolymers having such a high molecular weight that it is difficult to obtain fusion of toner particles prepared from such copolymer binders at reasonable temperatures unless undesirable chain transfer agents are used in the emulsion polymerization process. Such chain transfer agents are undesirable for incorporation in materials to be used in toner particles because they tend to alter the triboelectric characteristics of the resultant toner particles. Similarly, solution and bulk polymerization processes are undesirable for preparing relatively low molecular weight copolymers in finely divided particulate form because these processes are generally difficult to carry to completion and to control without complex, expensive equipment. Moreover, solution polymerization processes cannot be used for the preparation of crosslinked polymers. Accordingly, it is preferred to use a suspension polymerization process for the preparation of copolymers of vinyl aryl monomers and acrylic and/or methacrylic monomers as finely divided particles which have a relatively low molecular weight or which are crosslinked and possess valuable fusing properties.

One known type of aqueous suspension polymerization process for use in the polymerization of aryl compounds such as styrene compounds is that described in U.S. Pat. No. 2,694,700, issued Nov. 16, 1954. This patent describes a continuous process for the polymerization of vinyl compounds such as styrene in an aqueous suspension medium. The process, as indicated in the examples of this patent, is generally operated at temperatures less than the glass transition temperature of the resultant styrene polymer. That is, the process is generally carried out at a temperature within the range of from about 65° to about 85°C., whereas the glass transition temperature of polystyrene is approximately 100°C. As a result, no problems with agglomeration of polymer are encountered. The beads or particles of polymerized styrene produced in the continuous process illustrated in U.S. Pat. No. 2,694,700 are relatively large in size typically on the order of 1 to 3mm. average diameter. The smallest polymer beads described in U.S. Pat. No. 2,694,700 are reported to have an average diameter on the order of about 0.4 to 0.5mm. Polymer particles having such a relatively large size are generally undesirable for use in the preparation of electroscopic toner particles since they require extensive milling and grinding operations to reduce the particle size. That is, electroscopic toner particles generally have a particle size less than about 100 microns (i.e., 0.1mm); therefore, it is desirable to employ finely-divided polymeric particles having a particle size no greater than about 200 microns (i.e., 0.2mm) in the manufacture of these toner particles so that the amount of milling and grinding needed to obtain the resultant 100 micron or less toner particle is at a minimum.

A second known type of aqueous suspension polymerization processes are the non-continuous processes, for example, a bulk process wherein the total amount of monomeric reactants are added altogether at the same time, i.e., in bulk, to the aqueous suspension media. Typical of these bulk suspension processes are those described in U.S. Pat. Nos. 2,715,118; 3,390,142; 3,462,380; and 3,634,251.

As has been appreciated in the non-continuous aqueous suspension polymerization art, to obtain a low molecular weight polymer one must substantially increase the amount of polymerization initiator or catalyst used (see Column 1, lines 60–72 of U.S. Pat. No. 2,715,118, issued Aug. 9, 1955) or increase the polymerization temperature. However, if one attepts to add large amounts of initiator to hasten the polymerization reaction (and thereby decrease the molecular weight of the polymer), the reaction may become violent and uncontrollable causing a safety hazard in production of the polymer. On the other hand, if the amount of polymerization initiator is maintained at reasonable levels and the temperature of the process is raised to obtain a low molecular weight polymer, it is found that as the reaction temperature exceeds the glass transition temperature of the polymer being formed the polymer beads tend to agglomerate and coalesce to form a large mass of polymer.

One approach which has been attempted as a means to overcome the aforementioned problem of polymer bead agglomeration and coalescence in non-continuous aqueous suspension polymerization processes is illustrated in U.S. Pat. No. 3,172,878 issued Mar. 9, 1965. This patent, in part, describes a non-continuous aqueous suspension polymerization for the production of discrete, uniform, spherical polymer pills and asserts that the problem of particle agglomeration and coalescence can be partially avoided or eliminated by introduction of certain additional components, namely a combination of certain natural gums and polyacrylamide, into the aqueous suspending medium prior to polymerization. In accord with the non-continuous aqueous suspension polymerization process described in U.S. Pat. No. 3,172,878, the aforementioned combination of special additives is added to the aqueous suspending medium; thereafter, the suspending medium is slowly agitated and the monomers to be polymerized are introduced. The suspending medium described in U.S. Pat. No. 3,172,878 may be mildly heated, if desired, although no criticality is attached to such heating, and it appears that no heating at all (other than that attributable to ordinary room temperatures) is used in the specific non-continuous polymerization processes described in Example 1–6 of U.S. Pat. No. 3,172,878.

SUMMARY OF THE INVENTION

In accord with the present invention there is provided a high temperature, non-continuous, suspension polymerization process wherein a monomeric composition comprising an aryl compound having a polymerizable ethylenically unsaturated organo substituent is polymerized into finely-divided, low molecular weight polymer particles in an aqueous liquid suspension media maintained at a temperature during said polymerization which is greater than the glass transition temperature of the resultant polymer. The process of the invention is carried out without using large amounts of polymerization initiator or suspending agent.

The process of the present invention is accomplished by forming a heated liquid suspension media comprising water and a water-soluble suspending agent. The amount of suspending agent employed is less than about 3% by weight based on the total weight of the monomeric composition to be polymerized. The liquid suspension media is heated to a temperature above the glass transition temperature of the desired polymer. Thereafter, the monomeric composition comprising, for example, styrene or a polymerizable styrene homolog, as well as any additional polymerizable ethylenically unsaturated monomers which may be copolymerized with the styrene monomer, and an initiator soluble in the liquid monomeric composition is introduced into the heated aqueous suspension media. The monomeric composition and the initiator are substantially simultaneously introduced at a slow, substantially continuous rate over a time within the range of from 20 to about 85 percent of the total polymerization reaction time. Throughout the introduction of the initiator and monomer, the heated suspension media is subjected to continuous, high-rate shearing action. The total amount of initiator introduced is generally less than about 5 weight percent based on the total weight of monomer to be polymerized. The heated suspension media containing the initiator and monomeric composition is maintained at a temperature above the glass transition temperature of the desired polymer and high-rate shearing action is continued until polymerization is substantially complete. Upon completion of the polymerization, the aqueous suspension media is cooled below the glass transition temperature of the polymerized material suspended therein while maintaining shearing action. As a result, finely-divided, insoluble, low molecular weight polymeric particles are formed suspended in the aqueous suspension media.

In accord with the process of the present invention, it has been found that the resultant, low molecular weight polymeric particles exhibit little or no tendency to agglomerate or clump together in the suspension media and that particles possessing an average particle size less than about 200 microns are readily obtained. In addition, it has been found that these low molecular weight polymer beads are obtained in accord with the process of the invention without the use of special additives such as a combination of certain natural gums and polyacrylamide.

DESCRIPTION OF THE PREFERRED EMBODIMENTS

As will be apparent from the Summary of the Invention set forth hereinabove, the method of the present invention provides particles having a particle size less than about 200 microns without the use of special additives, such as a combination of certain natural gums and polyacrylamide, even though the suspension polymerization reaction is carried out at a temperature substantially above the glass transistion temperature of the polymeric product. Moreover, the amount of suspending agent and polymerization initiator are maintained at or below conventional suspension polymerization levels so that there is no danger of a violent, uncontrolled reaction occurring and so that the additional expense which would be required if large amounts of the suspending agent and/or polymerization initiator were used is eliminated.

In addition, in accord with the process of the present invention there is provided an effective method for obtaining low molecular weight polymers having a molecular weight equal to that of low molecular weight styrene-containing polymers having an inherent viscosity in chloroform within the range of from about 0.2 to about 0.6 (based on 0.25 g. polymer in 100 ml. chloroform at 25°C.).

In accord with a preferred embodiment of the invention, it has been found that fusible crosslinked styrene copolymers having a softening temperature within the range of from 40°C. to about 200°C., preferably 40°C. to about 65°C., may be readily produced. As used herein the term "softening temperature" refers to the softening temperature of a polymer as measured on E. I. duPont de Nemours and Company Model 941 TMA (Thermal Mechanical Analyzer) apparatus using a probe pressure of 48 p.s.i.a. and a heating rate of 5°C/minute.

The process of the invention is typically carried out under normal atmospheric pressure. Higher or lower pressure could also be used, if desired. For example, if a particular monomer to be polymerized has a relatively low boiling point, it may be advantageous to employ higher pressures to avoid boiling off the monomer while the suspension media containing the monomer is subjected to heating.

The polymerization reaction occurring in the present invention may be retarded or impeded by the presence of oxygen which can interfere with the polymerization. Accordingly, the reaction is advantageously carried out in an oxygen-free environment produced, for example, by evacuating the liquid suspension media and carrying out the polymerization in a nitrogen atmosphere. Of course, other oxygen-free atmospheres may also be employed.

The aqueous suspension media used in the present invention typically is composed of water; however, small amounts of other polar organic liquids such as the lower alkyl alcohols may be present in the aqueous suspension media. In any case, the resultant liquid suspension media is characterized by the fact that it is a non-solvent for the resultant polymers which are produced.

The suspending agent or dispersant, as it is sometimes called in the art, may be selected from any of a variety of materials known in the suspension polymerization art. The suspending agent is preferably a polymeric material such as starch, poly(vinyl alcohol), and the like. However, various inorganic powders such as water-soluble alkali metal carbonates, silicates, phosphates, and the like may also be used. A wide variety of these materials are well known and referenced, for example, in the *Encyclopedia of Polymer Science and Technology*, Interscience Publishers, 1970, under the topic "Suspension Polymerization." Whatever suspending agent is used, it is necessary that the agent be soluble in the aqueous suspension media, and it is desirable that the surface active properties of the agent are such that it is incapable of micelle formation. If micelle formation were to occur one could undesirably obtain emulsion polymerization, rather than the desired suspension polymerization of the present invention.

As indicated earlier herein, the amount of suspending agent utilized is similar to or less than that ordinarily employed in conventional suspension polymerization processes even though the reaction temperature of the present suspension polymerization process is substantially higher than the glass transition temperature of the polymer formed. Normally, operating at such relatively high polymerization temperatures, one would expect additional amounts of suspending agent would be required to prevent fusing and agglomeration of the polymer as it is formed in the polymerization reaction. The actual amount of suspending agent employed will, of course, vary depending upon the particular composition of the aqueous suspending media and the particular polymer initiators and monomers undergoing reaction. Generally, however, no more than about 3 percent based on the total amount of monomeric composition to be polymerized is required and typically the amount of suspending agent is within the range of from about 0.05 to 1.0 percent by weight based on the total amount of monomeric composition to be polymerized. In accord with an especially preferred embodiment of the invention, it has been found that medium to high viscosity poly(vinyl alcohol), such as Elvanol commercially available from E. I. DuPont de Nemours and Company, having a molecular weight greater than about 100,000 is an especially effective suspending agent for use in the present invention.

The polymerization initiator or catalyst, as it is sometimes referred to in the polymer art, may be selected from any of a variety of materials known to be useful for this purpose in the polymer art. Representative of typical polymerization initiators or catalysts include materials such as 2,2'-azobis(2-methylpropionitrile) or a peroxy compound such as benzoyl peroxide, cumene peroxide, di-tert-butyl peroxide, n-propyl peroxide, bis(n-chlorobenzoyl)peroxide, tert-butyl peracetate, di-tert-butyl disperphthalate, tert-butylperoxy isopropyl carbonate, tert-butyl perbenzoate, 2,5-dimethyl-2,5-di-(tert-butylperoxy)hexane, or 2,5-dimethyl-2,5-di(tert-butylperoxy)hexyne-3. Mixtures of such polymerization initiators or catalysts can also be used. Whatever polymerization initiator or catalyst is employed, the catalyst chosen should be soluble in the monomeric composition to be polymerized.

As indicated above, since the process of the present invention employs a relatively high polymerization reaction temperature substantially above the glass transition temperature of the polymer being formed, it is unnecessary to utilize large amounts of polymerization initiator to obtain the production of low molecular weight polymer. Thus, the total amount of polymerization initiator used in the present invention is generally less than about 5% by weight of the total weight of the monomeric composition to be polymerized and typically is within the range of from about 0.5 to about 3 percent by weight based on the total weight of the monomeric composition. As will be appreciated, the amount and particular polymerization initiator or mixtures thereof used in the process of the present invention will depend in large part on the particular monomers to be polymerized, the particular operating temperature above the glass transition temperature which is chosen, and the like. Polymerization initiators which have been found especially effective for use in the present invention include 2,2'-azobis-(2-methylpropionitrile) and benzoyl peroxide.

Although the process of the present invention has been found particularly effective in the polymerization of styrene monomers or styrene homolog monomers, various other aryl monomers may be polymerized in accord with the invention.

A large number of the above-described aryl monomers are well known in the polymer art. Representative of these aryl monomers are compounds having (a) an aromatic nucleus comprising 4 to 14 ring atoms in the aromatic nucleus, including fused aromatic rings as well as heterocyclic aromatic rings comprising oxygen, nitrogen, or sulfur hetero atoms, and (b) at least one polymerizable ethylenically unsaturated organo substituent typically comprising 3 to 10 carbon atoms chemically bonded to the aromatic nucleus. These monomers include: monovinyl aromatic compounds such as styrene; the halogenated styrenes such as mono- and dichloro styrene; the alkyl styrenes such as the methyl styrenes, the ethyl styrenes, the dimethyl styrenes, the diethyl styrenes, the isopropyl styrenes; the mixed alkyl styrenes and the halogenated alkyl styrenes; nuclear-substituted vinyl aryl compounds wherein the nuclear substituent is an alkyl, aryl, alkaryl, aralkyl, cycloalkyl, alkoxy, aryloxy, chloro, fluoro, chloromethyl, fluoromethyl, or trifluoromethyl group; the vinyl naphthalenes, methyl vinyl naphthalenes and their halogenated derivatives; vinyl pyridines; vinyl quinolines; vinyl carbazoles; vinyl furans; vinyl aryl acids or mixtures of any two or more different aryl monomers; or mixtures comprising one or more aryl monomers and one or more ethylenically unsaturated monomer copolymerizable with said aryl monomer(s).

Representative of various ethylenically unsaturated monomers copolymerizable with the aforementioned aryl monomers are monomers comprising 3 to about 20 carbon atoms and a polymerizable vinyl, vinylene, or vinylidene group such as the vinyl alkyl acids, for example, acrylic acid, and the $\alpha$-alkyl substituted acrylic acids such as methacrylic acid, and esters of such acids and aliphatic alcohols, for example, the acrylates and methacrylates; the amides of acrylic and methacrylic acids and derivatives thereof such as the methacrylamides, acrylamides, N-substituted-methacrylamides, for example, N,N-diethylacrylamide, N-ethylmethacrylamide, N,N-dimethylmethacrylamide, etc; the nitriles such as acrylonitrile, methacrylonitrile, ethylacrylonitrile, chloroacrylonitrile and other nitriles; the alkyl esters of alpha-ethylenic aliphatic dicarboxylic acids such as diethyl fumarate and diethyl itaconate; the unsaturated ketones, methyl vinyl ketone and methyl isopropyl ketone; the esters of vinyl alcohols such as vinyl acetate; acylamino substituted acrylic and methacrylic acids; the ethers of olefinic alcohols, especially the ethers of vinyl and allyl type alcohols such as vinyl ethyl ether, vinyl butyl ether, vinyl tolyl ether, divinyl ether, methyl isopropenyl ether, methallyl ethyl ether; the unsaturated aldehydes such as acrolein and methacrolein and the like; copolymerizable alkenyl chlorides including methallyl chloride, allyl chloride, vinyl chloride, vinylidene chloride, 1-chloro-1-fluoroethylene and 4-chlorobutene-1; and the vinylidenes.

In accord with the preferred embodiment of the present invention, a vinyl aromatic polymer is obtained which is a copolymerized blend comprised of from about 40 to 90 percent by weight styrene or styrene homolog, and from about 10 to about 60 percent by weight of at least one alkyl acrylate or methacrylate, including branched alkyl and cycloalkyl acrylates and methacrylates such as 2-ethylhexyl or cyclohexyl acrylate and methacrylate, having 1 to about 20 or more carbon atoms in the alkyl group thereof. Preferably, the copolymerized blend is comprised of from about 40 to about 90 percent by weight of styrene or styrene homolog, about 5 to about 50 percent by weight of a lower alkyl acrylate or methacrylate containing from 1 to about 4 carbon atoms in the alkyl group thereof, and from about 5 to about 50 percent by weight of a higher alkyl acrylate or methacrylate containing from 6 to about 20 or more carbon atoms in the alkyl group thereof. As used in the present invention the phrase "styrene or styrene homolog" is defined to include a monomer or mixture of monomers having the formula

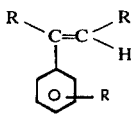

wherein R represents hydrogen, a halogen such as chlorine or bromine, a lower alkyl, including halogenated alkyls, containing 1–4 carbon atoms in alkyl moiety such as methyl, ethyl, propyl, isopropyl, butyl, and halogenated derivatives thereof.

The process of the present invention is particularly useful in preparing crosslinked vinyl aromatic polymers of the type described immediately hereinabove wherein the copolymerized blend of monomeric reactants includes a polymerizable monomer containing two or more polymerizable ethylenically unsaturated groups. The latter monomer serves as a crosslinking compound for the remaining monomeric reactants.

Typical of such crosslinking organic compounds containing two or more polymerizable ethylenically unsaturated groups are the following materials: vinyl compounds such as divinyl benzene; allyl-containing compounds such as triallylcyanurate and N,N-diallylmelamine; mixed allyl-vinyl compounds such as allyl acrylate; vinylidene compounds such as ethyleneglycol dimethacrylate; mixed allyl-vinylidene compounds such as allyl methacrylate; and mixed vinyl-vinylidene compounds such as the mixed ester prepared from ethylene glycol and acrylic and methacrylic acids. Other useful type crosslinking compounds include the following: aromatic compounds, for example, divinyltoluene, divinylxylene, divinylethylbenzene, trivinylbenzene, divinylnaphthalene, divinylmethylnaphthalenes; the crosslinking vinyl esters, allyl esters and vinyl allyl esters of carboxylic and polycarboxylic acids including polymerizable esters, monomers such as diallyl maleate, vinylcrotonate, 1,3-butylene dimethacrylate, divinyl succinate, divinyl adipate, vinyl acrylate, vinyl methacrylates; the aliphatic acetylenes such as vinylacetylene, and alpha-methylvinylacetylene.

Although the amount of crosslinking organic compounds may vary depending upon the degree of crosslinking desired, the particular type of the remaining monomers to be copolymerized with the crosslinking compound, the particular polymerization conditions, the molecular weight of the crosslinking compound, and the like; the amount of crosslinking compound is typically greater than about 0.01 and preferably within the range of from about 0.01 to about 5 weight percent based on the total weight of the monomeric composition to be polymerized.

The amount of monomeric composition used in the process of the invention may vary considerably. Typically, it has been advantageous to employ an amount of monomeric composition within the range of from about 0.05 to about 100% by weight based on the total weight of the aqueous suspension media in which the polymerization is carried out.

As indicated hereinabove, the aqueous liquid suspension media containing the dispersing agent dissolved therein is heated prior to addition of the polymerization initiator and monomeric composition to be polymerized. Since the temperature at which the aqueous suspension media is heated is above the glass transition temperatures of the resultant polymer obtained, and since the polymer has a tendency to agglomerate and coalesce when present in an aqueous suspension at a temperature above the glass transition of the polymer, it is extremely important in accord with the process of the invention that the aqueous suspension media be subjected to high rate, substantially continuous shearing action such as by stirring, mixing or otherwise agitating the liquid suspension media throughout the polymerization process. In the present application, the term "high rate," as used to describe the degree of shearing action imparted to the aqueous suspending medium during the process of the present invention, is defined to mean an amount of shearing action equivalent to that denoted by a Pfaudler Index Number within the range of from 3 to about 7. Pfaudler Index Numbers are described in technical literature published by The Pfaudler Co., a division of Pfaudler Permutit Inc. and represent an index which measures the amount of shear necessary to obtain various desired operating conditions in mixing and blending equipment such as is available from The Pfaudler Co. See Pfaudler Permutit Inc. Bulletin 1018 entitled "Agitation Speed-Power Calculator" copyright 1961, incorporated herein by reference.

The temperature at which the suspension polymerization reaction of the present invention occurs is, as stated above, above the glass transition temperature of the desired polymeric product. Typically the polymerization temperature is maintained at a fairly constant level of from about 5° to 20°C. above the glass transition temperature of the desired polymer.

It is critical in the present invention that the rate of addition of (a) the monomer to be polymerized and (b) the polymerization initiator be carefully regulated. If this is not done, one encounters many of the same problems arising in conventional, non-continuous aqueous suspension polymerization processes as noted in the Prior Art section of this application. That is, the polymeric product tends to agglomerate and it is extremely difficult to obtain a product having an average particle size less than about 200 microns. In accord with the present invention, it has been found desirable to add the monomer and initiator substantially simultaneously to the heated aqueous suspension media over a total time period within the range of from 20 to about 85 percent of the total polymerization reaction time required. In general, to shorten the total polymerization time, it is advantageous to add the monomer and initiator to the heated suspension media in as short a time as possible without causing particle agglomeration. Preferably, therefore, the monomer and initiator are added over a period of time within the range of from 20 to about 50 percent of the total reaction time required for the suspension polymerization process of the invention. For example, where the total time for polymerization as measured from the first addition of monomer to the heated suspension media to the completion of the polymerization reaction is about 6 or 7 hours, it is desirable to add the monomer and initiator at a slow, substantially continuous rate extending over 2 to about 3 hours.

In accordance with a preferred embodiment of the present invention, it has been found advantageous to prepare a mixture of the monomeric composition and polymerization initiator prior to the introduction thereof into the aqueous suspension media. Since the polymerization initiator, as indicated above, is substantially soluble in the liquid monomeric composition to be polymerized, this may be readily accomplished simply by admixing the polymerization initiator into the liquid monomeric composition prior to polymerization. This insures that the initiator and monomer are homogeneously dispersed throughout the suspension media of the invention and insures that the monomer and initiator are being added substantially simultaneously with one another. Therefore, the polymerization process of the invention proceeds at a substantially uniform and continuous rate and prevents any buildup of an excess amount of monomer or initator in localized areas throughout the liquid suspension media. Such buildup of either the initiator or monomer tends to promote agglomeration and coalescence of monomer or partially reacted polymer thereby interfering with the production of finely-divided polymer particles.

It has been found that if the monomeric composition and the initiator are not added at the slow, substantially continuous rate specified in accordance with the present process, one must substantially increase the amount of dispersing agent or the amount of polymerization initiator or both to prevent coalescence and agglomeration of the resultant polymer product. Such agglomeration and coalescence is, of course, undesirable.

Following the completion of the polymerization reaction, the aqueous suspension media containing the desired polymer product therein is cooled below the glass transition temperature of the polymer product while maintaining shearing of the suspension media. High-rate shearing is maintained during this cooling step to prevent agglomeration and coalescence of the polymer product as the suspension media is cooled. As a result, one obtains low molecular weight, finely-divided polymer particles having an average particle size less than about 200 microns and preferably less than about 100 microns dispersed throughout the cooled aqueous suspension media. These finely-divided polymer particles may be separated from the aqueous suspension media by a variety of means such as by filtration or centrifuging the aqueous suspension media followed by washing, and drying to evaporate any residual aqueous media from the surface of the finely-divided polymer product.

The following examples illustrate the practice of the present invention using a non-continuous, batch aqueous suspension polymerization process.

EXAMPLE 1

A 3-necked, 2-liter flask fitted with a stirrer and condenser is charged with 800 g of water and evacuated and allowed to return to atmospheric pressure by feeding nitrogen into the evacuated flask three times. 25 ml. of an aqueous solution containing 3% by weight of poly(vinyl alcohol) (Elvanol 50–42 sold by E. I. DuPont de Nemours and Company) is added and the temperature is raised to and maintained at 75°C. A mixture of 18 g. of benzoyl peroxide, 300 g. styrene, 150 g. of methyl methacrylate, and 150 g. of 2-ethylhexyl methacrylate is added to the flask from a dropping funnel over a period of about 3 hours while stirring at 400 rpm which, based on the particular flask and stirrer used in this example, corresponds to a rate of shear equivalent to a Pfaudler Index No. of about 5. Stirring at 75°C. is continued for about 16 hours after the addition is completed. The polymerization reaction is substantially completed within the first 3 hours of the aforementioned 16 hour period. The mixture is cooled, the solid polymer is collected by filtration and dried under vacuum at 40°C. to provide beads averaging about 100 $\mu$ in diameter. The polymer has an inherent viscosity in chloroform of 0.31 (measured at 25°C. at a concentration of 0.25 g. polymer/deciliter of solution) and a glass transition temperature of about 65°C.

EXAMPLE 2

A mixture of 300 g. of styrene, 210 g. of methyl methacrylate, 90 g. of 2-ethylhexyl acrylate, 50 g. ethyl acryloylacetate and 18 g. benzoyl peroxide is added dropwise over a 2½ hour period to a stirred flask containing 800 g. distilled water and 25 ml. of a three percent aqueous solution of poly(vinyl alcohol) (Elvanol 52–22 sold by DuPont) at 75°C. The rate of shearing action maintained in the aforementioned stirred flask is equivalent to that denoted by a Pfaudler Index No. of about 5. After completion of the addition, the mixture is stirred at 75°C. under nitrogen for another 12 hours. The polymerization reaction is substantially completed within the first 3 hours of the aforementioned 12 hour period. The product is then collected by cooling, filtering, washing and drying and consists of low molecular weight, finely-divided polymeric beads having an average particle size less than about 200 microns.

EXAMPLE 3

Into a 200-gallon reactor are charged 300 kg. distilled water, and the dissolved oxygen is removed by 3 evacuations, followed by purging with nitrogen each time. Ten kg. of Vinol 540 solution (a trademark of Air Products and Chemicals, Inc. for an aqueous poly(vinyl alcohol) solution containing 4.93% solids) are added to the reactor and the stirring is set for 110 rpm which, in the particular reactor used in this example, corresponds to a shear rate equivalent to a Pfaudler Index No. of about 5.

Into a 30-gallon header tank a mixture of 30 kg. of styrene, 15 kg. of methyl methacrylate, 15 kg. of 2-ethylhexyl methacrylate, 180 g. of divinylbenzene, and 1200 g. of 2,2′-azobis(2-methylpropionitrile) are charged and a homogeneous solution is made by stirring.

The temperature in the reactor is brought up to 75°C. and then the monomer solution is pumped into the reactor in about 2½ hours.

At the completion of the pumping, the reactor is held at 75°C. for another 4 hours. It is then cooled to room temperature, and the polymer is isolated by centrifuging, washing and drying. 51 kg. of low molecular weight, finely-divided, crosslinked polymeric particles are obtained having an average particle size less than about 100 microns.

The invention has been described in detail with particular reference to preferred embodiments thereof, but it will be understood that variations and modifications can be effected within the spirit and scope of the invention.

I claim:

1. A high temperature, non-continuous, suspension polymerization process wherein a monomeric composition comprising at least about 40% by weight of an aryl monomer having a polymerizable ethylenically unsaturated organo substituent is polymerized into finely divided polymer particles in a liquid suspension media free from natural gums and polyacrylamide, the resultant polymer comprising said particles having the following properties: a low molecular weight equal to a styrene-containing polymer having an inherent viscosity within the range of from about 0.2 to about 0.6, insolubility in the liquid suspension media, and a glass transition temperature lower than the temperature maintained in said suspension media during polymerization, said process comprising the sequential steps of:
   a. forming a heated liquid suspension media comprising water and a water-soluble suspending agent, said agent being present in said media in an amount less than about 3 percent by weight based on the total weight of said monomeric composition, said media being heated to a temperature above the glass transition temperature of said polymer particles;
   b. substantially simultaneously introducing into said heated media (1) said monomeric composition and (2) a polymerization initiator soluble in the monomeric composition in an amount effective to initiate polymerization thereof, said monomeric composition and initiator being introduced at a slow, substantially continuous rate over a time within the range of from 20 to about 85 percent of the total polymerization reaction time, said heated media being subjected to continuous, high-rate shearing action throughout the addition of (1) and (2), and the total amount of initiator introduced being less than about 5 weight percent based on the total weight of said monomeric composition;
   c. maintaining, until polymerization is substantially complete, said high-rate shearing action and said media at a temperature above the glass transition temperature of said polymer particles and
   d. cooling said media below the glass transition temperature of said polymer particles while maintaining said high-rate shearing action to obtain finely-divided polymeric particles suspended in the liquid suspension media.

2. A high temperature, non-continuous, suspension polymerization process wherein a monomeric composition comprising at least 40% by weight of an aryl monomer having a polymerizable ethylenically unsaturated organo substituent is polymerized into finely-divided polymer particles in a liquid suspension media free from natural gums and polyacrylamide, the resultant polymer comprising said particles having the following properties: a low molecular weight equal to a styrene-containing polymer having an inherent viscosity within the range of from about 0.2 to about 0.6, insolubility in the liquid suspension media, and a glass transition temperature lower than the temperature maintained in said suspension media during polymerization, said process comprising the sequential steps of:
   a. forming a heated liquid suspension media comprising water and a water-soluble suspending agent, said agent being present in said media in an amount less than about 3 percent by weight based on the total weight of said monomeric composition, said media being heated to a temperature above the glass transition temperature of said polymer particles;
   b. substantially simultaneously introducing into said heated media (1) said monomeric composition and (2) a polymerization initiator soluble in the monomeric composition in an amount effective to initiate polymerization thereof, said monomeric composition and initiator being introduced at a slow, substantially continuous rate over a time within the range of from 20 to about 50 percent of the total polymerization reaction time, said heated media being maintained in an oxygen-free environment and subjected to continuous, high-rate shearing action throughout the addition of (1) and (2), and the total amount of initiator introduced being less than about 5 weight percent based on the total weight of said monomeric composition;
   c. maintaining, until polymerization is substantially complete, said high-rate shearing action and said media in an oxygen-free environment at a temperature above the glass transition temperature of said polymer particles and
   d. cooling said media below the glass transition temperature of said polymer particles while maintaining said high-rate shearing action to obtain finely divided polymeric particles suspended in the liquid suspension media.

3. The suspension polymerization process as defined in claim 1 wherein said monomeric composition and initiator are admixed together prior to introduction into the heated suspension media and are introduced into said media over a time equal to at least 30 percent of the total polymerization reaction time.

4. The suspension polymerization process of claim 2 wherein said monomeric composition comprises styrene or a styrene homolog.

5. The suspension polymerization process of claim 2 wherein said monomeric composition comprises a blend of styrene or styrene homolog and an alkyl acrylate or methacrylate.

6. The suspension polymerization process of claim 2 wherein said monomeric composition comprises a blend of styrene or styrene homolog, an alkyl acrylate or methacrylate, and a crosslinking compound comprising two or more polymerizable ethylenically unsaturated groups.

7. A high temperature, non-continuous, suspension polymerization process wherein a monomeric composition comprising at least about 40% by weight of styrene or a styrene homolog is polymerized into finely-divided polymer particles in a liquid suspension media free from natural gums and polyacrylamide, the resultant polymer comprising said particles having the following properties: an inherent viscosity within the range of from 0.2 to 0.6, insolubility in the liquid suspension media, and a glass transition temperature lower than the temperature maintained in said suspension media during polymerization; said process comprising the sequential steps of:

a. forming a heated liquid suspension media free from natural gums and polyacrylamide and comprising water and a water-soluble polymeric suspending agent, said agent being present in said media in an amount less than about 3 percent by weight based on the total weight of said monomeric composition, said media being heated to a temperature above the glass transition temperature of said polymer particles;

b. introducing into said heated media an admixture of (1) said monomeric composition and (2) a polymerization initiator soluble in the monomeric composition in an amount effective to initiate polymerization thereof, said monomeric composition and initiator being introduced at a slow, substantially continuous rate over a time within the range of from 20 to about 50 percent of the total polymerization reaction time, said heated media being maintained in an oxygen-free environment and subjected to continuous, high-rate shearing action throughout the addition of (1) and (2), and the total amount of initiator introduced being less than about 5 weight percent based on the total weight of said monomeric composition;

c. maintaining, until polymerization is substantially complete, said high-rate shearing action and said media in an oxygen-free environment at a temperature above the glass transition temperature of said polymer particles and d. cooling said media below the glass transition temperature of said polymer particles while maintaining said high-rate shearing action to obtain finely-divided polymeric particles having an average particle size less than 200 microns suspended in the liquid suspension media.

8. The suspension polymerization process of claim 7 wherein said suspending agent is poly(vinyl alcohol).

* * * * *